(12) United States Patent
Kuchi et al.

(10) Patent No.: US 7,006,579 B2
(45) Date of Patent: Feb. 28, 2006

(54) ISI-ROBUST SLOT FORMATS FOR NON-ORTHOGONAL-BASED SPACE-TIME BLOCK CODES

(75) Inventors: Kiran Kuchi, Irving, TX (US); Olav Tirkkonen, Helsinki (FI); Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 823 days.

(21) Appl. No.: 10/023,924

(22) Filed: Dec. 18, 2001

(65) Prior Publication Data

US 2002/0126648 A1 Sep. 12, 2002

Related U.S. Application Data

(63) Continuation-in-part of application No. 09/676,373, filed on Sep. 29, 2000, and a continuation-in-part of application No. PCT/FI00/00916, filed on Sep. 4, 2000.

(30) Foreign Application Priority Data

Dec. 22, 2000 (FI) .................................. 20002845
Jun. 25, 2001 (FI) .................................. 20011357

(51) Int. Cl.
*H04L 27/04* (2006.01)

(52) U.S. Cl. ..................................................... 375/295

(58) Field of Classification Search ................ 375/295, 375/267, 259, 285, 260; 370/203, 208, 464, 370/390; 708/514, 520
See application file for complete search history.

(56) References Cited

U.S. PATENT DOCUMENTS

| | | | | |
|---|---|---|---|---|
| 6,317,411 | B1 * | 11/2001 | Whinnett et al. | 370/204 |
| 6,317,466 | B1 * | 11/2001 | Foschini et al. | 375/267 |
| 6,631,168 | B1 * | 10/2003 | Izumi | 375/295 |
| 6,865,237 | B1 * | 3/2005 | Boariu et al. | 375/295 |

OTHER PUBLICATIONS

E. Lindskog and A. Poulraj, "A transmit diversity scheme for channels with intersymbol interference," in Proc. IEEE ICC2000, vol. 1, pp. 307-311.
A. Naguib. "On the matched filter bound of transmit diversity techniques," in Proc. IEEE ICC2001, Jun. 2001.

* cited by examiner

Primary Examiner—Khai Tran
(74) Attorney, Agent, or Firm—Cohen, Pontani, Lieberman & Pavane

(57) ABSTRACT

The transmit diversity and symbol rate in a wireless mobile system are increased by allocating the complex symbols to be transmitted in accordance with a time-space slot format that incorporates non-orthogonal-based matrices, defined as matrices whose format is such that the product of the matrix and its Hermitian transpose is other than the identity matrix times a real number other than unity. The non-orthogonal-based matrices are indexed by antenna and by symbol period. Copies and complex conjugates (or negative complex conjugates) of the same symbol that are transmitted from different antennas are mutually separated into non-adjacent parts of the slot. Each non-orthogonal-based "space-time" matrix is composed of orthogonal-based matrices, i.e., matrices other than non-orthogonal-based matrices. Preferably, sequences of complex conjugates are time-reversed in the slot.

40 Claims, 5 Drawing Sheets

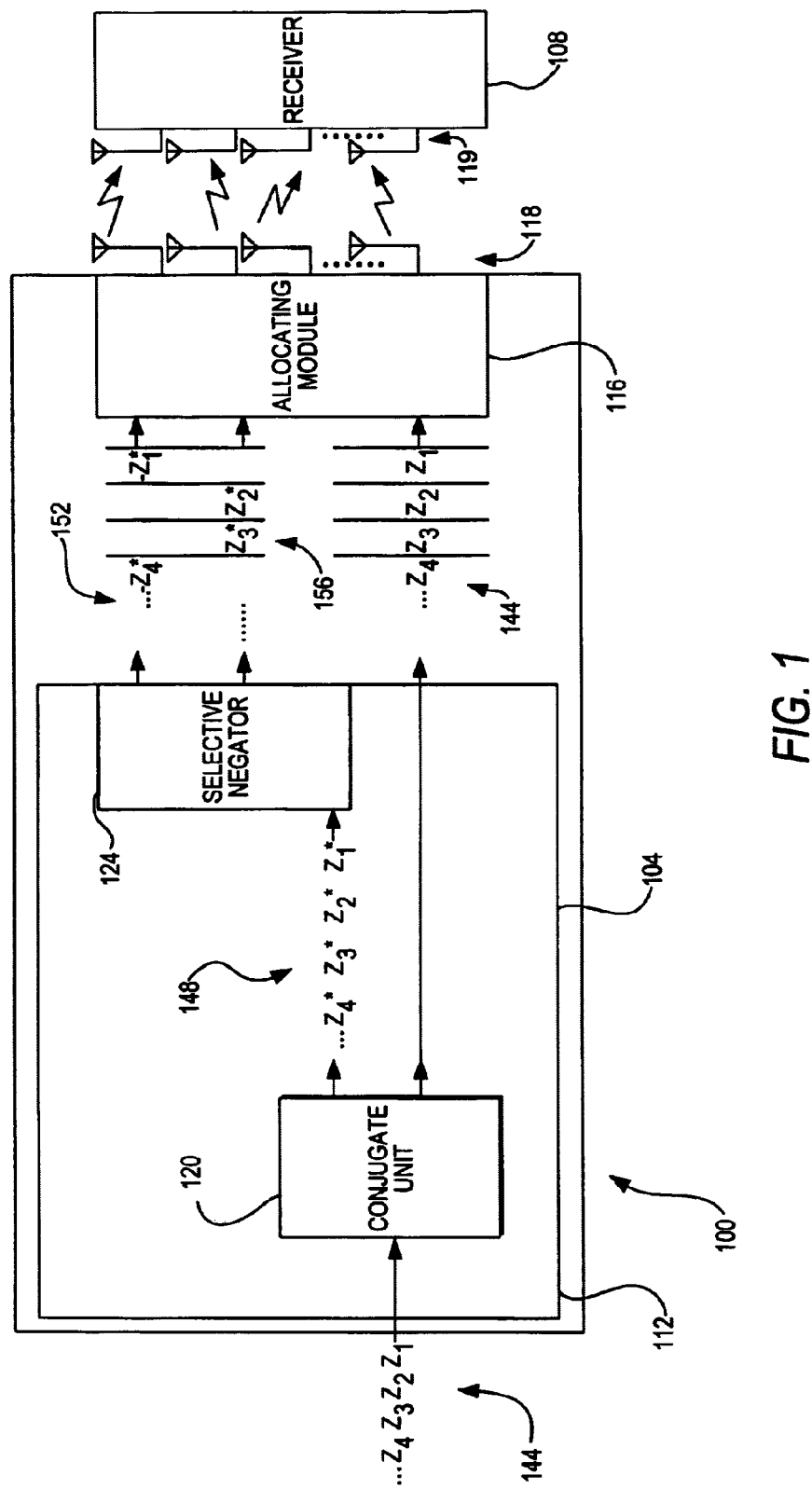

$$\text{SLOT} = \begin{bmatrix} z_1 & z_2 & \tilde{z}_3 & \tilde{z}_4 \\ z_5 & z_6 & \tilde{z}_7 & \tilde{z}_8 \\ \vdots & \vdots & \vdots & \vdots \\ z_{4n-3} & z_{4n-2} & \tilde{z}_{4n-1} & \tilde{z}_{4n-2} \end{bmatrix} \begin{matrix} \text{PILOTS} \\ \text{PILOTS} \\ \text{PILOTS} \\ \text{PILOTS} \end{matrix} \begin{bmatrix} z_2^* & -z_1^* & \tilde{z}_4^* & -\tilde{z}_3^* \\ z_6^* & -z_5^* & \tilde{z}_8^* & -\tilde{z}_7^* \\ \vdots & \vdots & \vdots & \vdots \\ z_{4n-2}^* & -z_{4n-3}^* & \tilde{z}_{4n}^* & -\tilde{z}_{4n-1}^* \end{bmatrix}^+$$

$$\mathrm{SLOT} = \begin{bmatrix} z_1 & z_7 & \cdots & z_{6n-5} \\ z_2 & z_8 & \cdots & z_{6n-4} \\ z_3 & z_9 & \cdots & z_{6n-3} \\ z_4 & z_{10} & \cdots & z_{6n-2} \\ z_5 & z_{11} & \cdots & z_{6n-1} \\ z_6 & z_{12} & \cdots & z_{6n} \end{bmatrix} \begin{matrix} \text{PILOTS} \\ \text{PILOTS} \\ \text{PILOTS} \\ \text{PILOTS} \\ \text{PILOTS} \\ \text{PILOTS} \end{matrix} \begin{bmatrix} z_2^* & z_8^* & \cdots & z_{6n-4}^* \\ -z_1^* & -z_7^* & \cdots & -z_{6n-5}^* \\ z_4^* & z_{10}^* & \cdots & z_{6n-2}^* \\ -z_3^* & -z_9^* & \cdots & -z_{6n-3}^* \\ z_6^* & z_{12}^* & \cdots & z_{6n}^* \\ -z_5^* & -z_{11}^* & \cdots & -z_{6n-1}^* \end{bmatrix}$$

$$\text{SLOT} = \begin{bmatrix} z_1 & z_5 & \cdots & z_{4n-3} & z_3 & z_7 & \cdots & z_{4n-1} & \text{PILOTS} & -z_{4n-2}^* & \cdots & -z_6^* & -z_{4n}^* & \cdots & -z_8^* & -z_4^* \\ z_2 & z_6 & \cdots & z_{4n-2} & z_4 & z_8 & \cdots & z_{4n} & \text{PILOTS} & z_{4n-3}^* & \cdots & z_5^* & z_{4n-1}^* & \cdots & z_7^* & z_3^* \\ z_3 & z_7 & \cdots & z_{4n-1} & z_1 & z_5 & \cdots & z_{4n-3} & \text{PILOTS} & -z_{4n}^* & \cdots & -z_8^* & -z_{4n-2}^* & \cdots & -z_6^* & -z_2^* \\ z_4 & z_8 & \cdots & z_{4n} & z_2 & z_6 & \cdots & z_{4n-2} & \text{PILOTS} & z_{4n-1}^* & \cdots & z_7^* & z_{4n-4}^* & \cdots & z_5^* & z_1^* \end{bmatrix}$$

ISI-ROBUST SLOT FORMATS FOR NON-ORTHOGONAL-BASED SPACE-TIME BLOCK CODES

CROSS-REFERENCE TO RELATED APPLICATIONS

This application is a continuation-in-part of U.S. patent application Ser. No. 09/676,373, filed Sep. 29, 2000. This application is also a continuation-in-part of PCT Application No. PCT/FI00/00916, filed Sep. 4, 2000. Priority is claimed on those applications and on Patent Application No. 20002845 filed in Finland on Dec. 22, 2000 and on Patent Application No. 20011357 filed in Finland on Jun. 25, 2001.

FIELD OF THE INVENTION

This invention relates to methods and systems for achieving transmit diversity in both space and time in a wireless telecommunication system.

BACKGROUND OF THE INVENTION

Transmission quality between a mobile phone and another mobile phone or a base station varies over time. Among the causes of such variation in transmission quality is the environment; thus, for example, obstacles of different kinds, shape and composition can divide the signal into multiple paths having different attenuation and length between the transmitting device and the receiving device. The relative movements of the transmitter and/or the receiver also contribute to temporal variations or "fading". The propagation of the signal may vary between good and poor even on a packet basis.

One method for overcoming fading is to increase the transmit diversity, which is a measure of the number of antennas concurrently transmitting the signal. Thus, if two antennas are redundantly transmitting the same information, the transmit diversity is two. The quality of transmission can vary over time due to fading but, due to their different spatial locations, one of the two antennas is likely, at any particular moment, to be transmitting better than the other antenna. The receiver can take advantage of this by accepting the signal from an antenna with a strong transmitting signal while excluding the redundant, degraded copy of the signal from the other antenna which is transmitting on a weaker channel.

A transmit diversity method by which two transmit antennas redundantly send information to a single receiving antenna is disclosed in U.S. Pat. No. 6,185,258 to Alamouti et al., which is incorporated herein by reference. Information is transmitted temporally during "time slots", the duration of which is small enough so that the transmission quality on each of the two channels is effectively constant during the time slot. A time slot is divided into symbol periods, each symbol period representing the time in which a single symbol is transmitted from an antenna. Under the Alamouti transmit diversity scheme, in a time slot having a duration of two symbol periods, a first antenna transmits a symbol $z_1$ during the first symbol period and a symbol $-z_2^*$ during the second symbol period, and a second antenna transmits a symbol $z_2$ during the first symbol period and a symbol $z_1^*$ during the second symbol period. Here, "a*" denotes the complex conjugate of "a"; i.e., if a=x+yj, then a*=x−yj. Time slots can be referred to as "time-space slots" in recognition that more than one antenna is transmitting —emphasizing that there is space diversity—or can simply be called "slots". The Alamouti matrix $C_{Ala}$ is shown below in equation (1), with each row corresponding to a transmit antenna and each column corresponding to a symbol period.

$$C_{Ala}(z_1, z_2) = \begin{bmatrix} z_1 & -z_2^* \\ z_2 & z_1^* \end{bmatrix} \quad (1)$$

If one of the two antennas is transmitting more robustly than the other during the time slot, both symbols can be derived solely from the stronger of the two transmissions. During the third and fourth symbol periods, a new slot is formed in which $z_3$ assumes the role of $z_1$ and $z_4$ assumes the role of $z_2$, and so on for subsequent time slots and respective symbol periods. Therefore, the transmit antennas transmit according to a sequence of 2×2 Alamouti codes. The kind of matrix, such as the 2×2 Alamouti matrix, that is used to represent transmit diversity over symbol periods is called a "space-time block code." Here, the space-time block code and the time slot happen to coincide although, as discussed below, this is not always the case. The diversity here is two or "two-fold", because each symbol is transmitted twice, by virtue of a delayed identical copy or delayed complex conjugate (or the negative of the complex conjugate or "negative complex conjugate"). Under the assumption that a single transmitter transmits one symbol per symbol period, the number of symbols that are transmitted per symbol period in a communication system is known as the "symbol rate". The symbol rate here is one, since a symbol is considered to be the same, for this purpose, as its complex conjugate or negative complex conjugate.

A time slot in accordance with the Alamouti technique is an "orthogonal-based matrix", which is defined here as a matrix that, when multiplied together with its Hermitian transpose, yields a real value times the identity matrix. The Hermitian transpose of a matrix A, denoted by $A^H$, is a matrix whose elements are the complex conjugates of the elements of the transpose of A. The transpose of a matrix is derived by reversing the row and column designations of each element of the matrix. The identity matrix, denoted "I", is a matrix with each element on its diagonal equal to unity and all other elements each to zero. Accordingly, for an orthogonal-based matrix A, it holds that $A^H A = A A^H = k \times I$, for some real value k. The orthogonal-based property of the Alamouti matrix allows the transmission to be parsed into individual symbols by a single receiver.

The Alamouti transmit diversity method, however, assumes that little or no intersymbol interference (ISI) exists on the channel. ISI is a form of distortion in which the delay in the reception of one signal interferes with the ability of the receiver to distinguish a subsequently transmitted signal. The transmission of a symbol, for instance, may arrive by different paths at a receiver, and thus exhibit the phenomenon known as multipath. Most of the time, multipath is good because the arriving components are added to deliver greater signal strength. Although the different paths and resulting path lengths of the components cause different components to arrive at the receiver at a slightly different time, such differences in the time of receipt are generally not a problem; the radio waves propagate at virtually the speed of light, and the time differences are therefore small. The arrival time span is called the delay spread.

Delay spread does become a problem at higher symbol transmission rates because the ISI makes it difficult to detect individual arriving symbols at the receiver. An equalizer is often used to estimate the different components of a signal.

To make the estimate, the equalizer is provided with training data on different paths and their relative timings and strengths. The training data may be in the form of pilot symbols that the equalizer knows ahead of time and receives with the transmission. The job of the equalizer is made easier by coding temporally adjacent symbols in such a way that respective components, when added (as through delay spread), can subsequently be separated. But if temporally adjacent symbols are redundant, i.e. because they are identical or complex conjugates, they are hard to separate at the receiver. The Alamouti technique transmits such temporally adjacent, redundant symbols and has empirically been found, on channels that experience ISI (i.e., ISI channels), to suffer from ISI distortion that renders transmit diversity ineffective.

Lindskog and Paulraj have proposed in "A Transmit Diversity Scheme for Channels with Intersymbol Interference", Proc. IEEE ICC2000, 2000, vol. 1, pp. 307–311, an orthogonal-based, space-time block code that, unlike the Alamouti code, is effective on ISI channels. The Lindskog/Paulraj time slot is shown below in expression (2):

$$\begin{bmatrix} z_1 & z_3 & \ldots & z_{2n-1} & \text{pilots} & z_{2n}^* & \ldots & z_4^* & z_2^* \\ z_2 & z_4 & \ldots & z_{2n} & \text{pilots} & -z_{2n-1}^* & \ldots & -z_3^* & -z_1^* \end{bmatrix} \quad (2)$$

In expression (2), the Alamouti code of equation (1) appears as the outermost nesting. That is, $z_1$ and $z_2$ are in the first symbol period, and the last symbol period is occupied by $z_2^*$ and $-z_1^*$ (with the negative signs switched, which still leaves the Alamouti matrix orthogonal-based). An Alamouti code corresponding to $z_3$ and $z_4$ is in the next most outer nesting, and so on for each subsequent symbol pair until $z_{2n-1}$ and $z_{2n}$. In expression (2), pilots refers to pilot symbols, which are added in a predefined place (here, in the middle of the time slot) and are used by the receiver to estimate characteristics of the channel as a means by which to reassemble signal components and thereby detect the transmitted symbols.

The main design criterion is to separate the two Alamouti symbol periods in an Alamouti slot into different halves of the Lindskog/Paulraj time slot, so that the transmission of a symbol and its complex conjugate is separated by $T_s/2$, where $T_s$ is the length of the Lindskog/Paulraj time slot, i.e., $T_s=$(2n symbol periods+pilot symbol periods), although preferably, and as seen in relation (2) above, the sequences of symbols transmitted in the right-hand side of the Lindskog/Paulraj time slot are time reversed. For transmission utilizing the Lindskog/Paulraj method, standard equalizers may be used to equalize the channels, and ISI is minimized to the extent that the separation of a symbol and its delayed copy exceeds the delay spread of the channel.

The Alamouti and Lindskog/Paulraj approaches, however, are based on orthogonal-based, space-time block codes, and are therefore limited as to symbol rate and transmit diversity. Both of these approaches have a symbol rate of one and a transmit diversity of one, and both are MISO (multiple input, single output). Adapting either method for use with more than two transmit antennas, i.e. MIMO (multiple input, multiple output), in a way that retains the orthogonal-based property of the code results in a still lower symbol rate and relinquishes the simple code form shown in equation (1). Increasing the number of receiving antennas in non-orthogonal-based systems (i.e., systems that are not orthogonal-based) to two would ordinarily afford the potential for a symbol rate as high as two.

However, the orthogonal-based property of the Alamouti and Lindskog/Paulraj codes limits the symbol rate to far below two, even if the number of receiving antennas is increased to two.

SUMMARY OF THE INVENTION

The present invention is directed to a method and apparatus for allocating to transmitting devices a stream of complex symbols that are to be transmitted in parallel by the transmitting devices and which includes replications that, for at least some of the symbols, include the complex conjugate or the negative complex conjugate of the symbol. The parallel transmission is temporally divided into time slots which are themselves temporally divided into symbol periods and that have respective first and second portions. The stream is allocated to the transmitting devices and to the symbol periods so that, for at least one of the time slots, the symbols in at least one symbol period in the first portion of the time slot have complex conjugate or negative complex conjugate representations in at least one symbol period in the second portion of the time slot. The representations and corresponding symbols constitute a non-orthogonal-based matrix, or "non-orthogonal-based space time block code" (hereinafter "NOBSTBC"), having dimensions that represent transmitting devices and symbol periods, respectively, and that has, as its constituents, orthogonal-based matrices. The transmitting devices transmit the allocated stream in parallel and in accordance with the allocation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings:

FIG. 1 depicts a transmit diversity system in accordance with the present invention;

FIG. 2 is a matrix representation of a slot format in accordance with a first embodiment of the present invention;

FIG. 4 is a matrix representation of another slot format in accordance with the second embodiment of the invention; and FIG. 5 is a matrix representation of a slot format in accordance with a third embodiment of the present invention.

DETAILED DESCRIPTION OF THE CURRENTLY PREFERRED EMBODIMENTS

Figure 3:
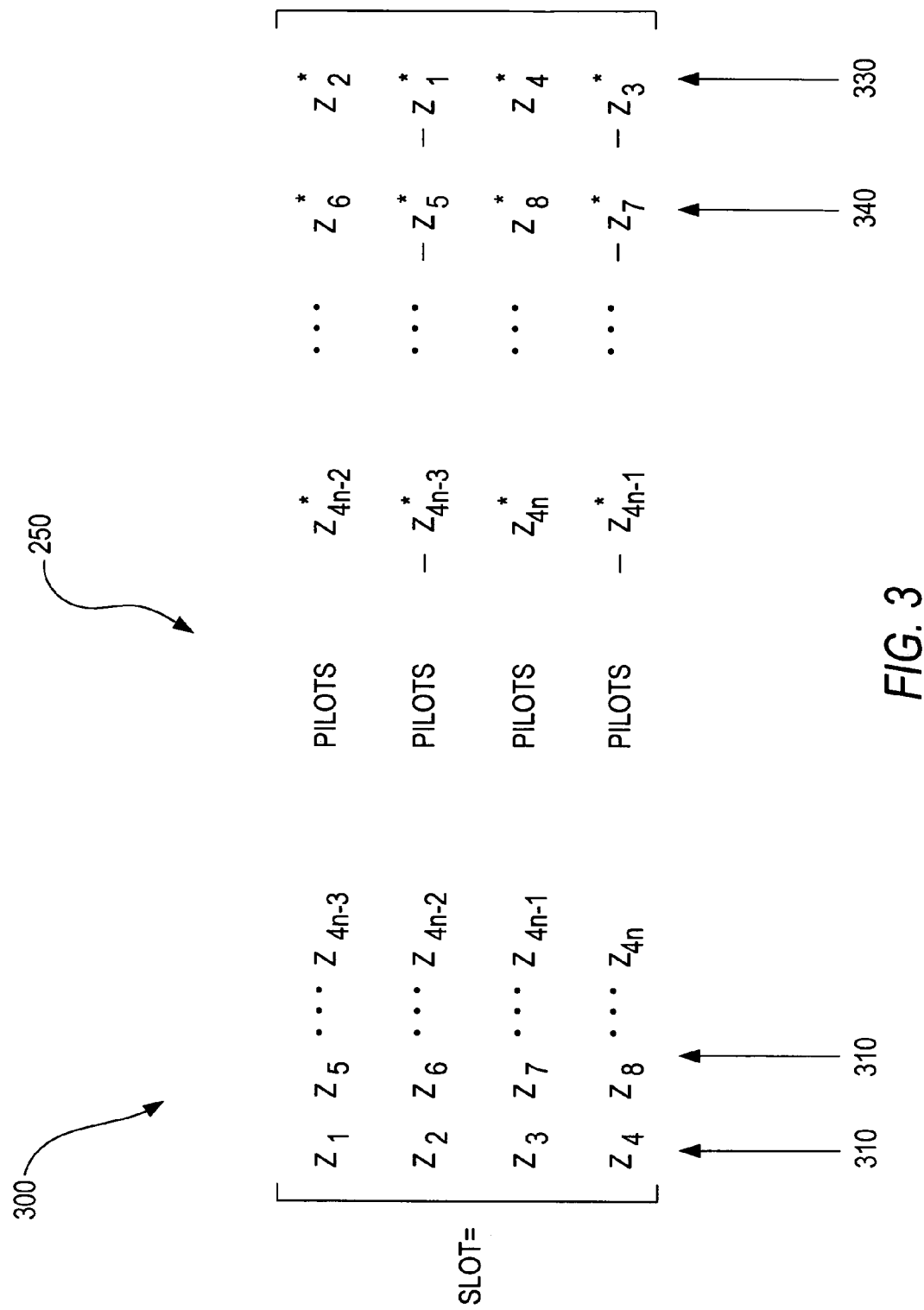
FIG. 3 is a matrix representation of a slot format in accordance with a second embodiment of the present invention.

FIG. 1 depicts by way of illustration a transmitter diversity system 100 which includes a transmitting apparatus 104, typically a base station, and a receiver 108, typically a mobile phone, although other types of transmitting and receiving devices are possible, and, alternatively, the invention may be implemented with a mobile phone as the transmitting apparatus 104 and with a base station as the receiver 108. The transmitting apparatus 104 includes a transmit diversifier 112, an allocating module 116 and a plurality of transmitting antennas 118. The receiver 108 includes a plurality of receiving antennas 119.

The transmit diversifier 112 includes a conjugate unit 120 and a selective negator 124. The conjugate unit 120 transforms complex symbols into their respective complex conjugates. The selective negator 124 selectively negates complex symbols. The allocating module 116 allocates complex symbols to transmitting antennas 118 and symbol periods. The transmitting antennas 118 transmit complex symbols to the receiving antennas 119. The receiving antennas 119 receive complex symbols for further processing by the receiver 108.

In operation, the conjugate unit 120 receives an incoming complex symbol stream 144, computes the complex conjugate of each symbol in the stream 144, and outputs, as a result, a conjugated complex symbol stream 148. The conjugate unit 120 also transmits the incoming complex symbol stream 144 unchanged. The selective negator 124 receives the conjugated complex symbol stream 148 and selectively negates some of the symbols in the stream 148 to produce a negated conjugated complex symbol stream 152. The symbols not negated form a non-negated conjugated complex symbol stream 156. Preferably, the conjugate unit 120 and the selective negator 124 both have conventional buffering and timing capability (not shown) to enable the transmit diversifier 112 to output the streams 144, 152 and 156 so that a symbol, its complex conjugate and its negative complex conjugate copy are concurrently transmitted as a composite stream to the allocating module 116 in the same temporal order indicated by the incoming complex symbol stream 144. The allocating module 116, which also has conventional buffering and timing capability (not shown), buffers arriving symbols, as necessary, to retain the symbols needed to form a current slot in accordance with formats discussed below. Alternatively, the allocating module 116, the conjugate unit 120 and the selective negator 124 may use other methods of synchronizing input streams to make available to the allocating module 116 the particular symbols needed to form a current time slot, such as through transmission blocks with headers. Upon receiving the streams 144, 152 and 156, the allocating module 116 forms a current time slot by allocating the symbols in the streams 144, 152 and 156 to transmitting antennas 118 and to symbol periods. The transmitting antennas 118 transmit, in parallel and in accordance with the allocating performed by the allocating module 116, signals having characteristics that are represented by the allocated complex symbols. The transmitting apparatus 104 then forms a next time slot from the incoming complex symbol stream 144, and so on.

The transmitted symbols are received by the receiver 108 via its receiving antennas 119. The receiver 108 uses the transmitted symbols to determine the symbols that were transmitted in the incoming complex symbol stream, for example using methods well-known in the art as described in U.S. Pat. No. 6,185,258 to Alamouti. The receiver 108 may, in addition, perform any method of equalization to resolve multipath distortion.

The transmission from the transmitter 100 to the receiver 108 is temporally divided into slots, which are temporally divided into symbol periods.

FIG. 2 shows an exemplary slot 200 in accordance with a first embodiment of the present invention. The slot 200 is shown as a sum of two matrices. The symbols "x" in the second matrix are of the form "x̄" to distinguish their respective modes of transmission. This difference between the modes aids the receiver in distinguishing between the component symbols of the added entries.

Typically, complex symbols are formatted for transmission in accordance with a conventional complex modulation scheme such as QPSK (quadrature phase shift key), 16-QAM (16-point quadrature amplitude modulation), 8-PSK (8-point phase shift key), 4-PSK (4-point phase shift key), etc., which represents a symbol by a point in a two-dimensional constellation. It should be noted that the intended scope of the present invention includes any modulation scheme for formatting complex symbols for transmission.

In QPSK, for example, a constellation consists of four points in the complex plane, e.g., $\{(1+j)/\sqrt{2}, (-1+j)/\sqrt{2}, (-1-j)/\sqrt{2}, (1-j)/\sqrt{2}\}$, each point being associated with a two-bit value such as 00, 01, 10 and 11, respectively. The signal is configured so that, in any given symbol period, two of its physical parameters correspond to respective coordinates in the complex plane that define a point near one of the constellation points. One physical parameter represents the real component of the defined point, and the other physical parameter represents the imaginary component of the defined point. Thus, the signal transmitted by an antenna during any particular symbol period is represented by the complex symbol $z_i$ and, upon receipt, is interpreted by the receiver as one of the four constellation points, e.g., the constellation point closest to the defined point. The associated value of the determined constellation point constitutes the two bits of information conveyed by the transmission system during the symbol period. Other modulation schemes use other constellations; thus, for example, 8-PSK uses eight constellation points. 4-PSK, like QPSK, uses four constellation points but uses different constellation points than does QPSK; specifically, 4-PSK uses the constellation points $\{1, j, -1, -j\}$.

In the current embodiment in which matrices are added (as shown in FIG. 2) to allow $z_1$ and $z_3$ to be distinguished at the receiver despite their addition before being transmitted, the constellations by which $z_1$ and $z_3$ are encoded are preferably defined such that points in the constellation of $z_1$ do not overlap with the points in the constellation of $z_3$. That is, the points in one constellation preferably are all distinct from those in the other constellation. Similarly, the points in the constellation of $z_2$ should not overlap with the points in the constellation of $z_4$. In addition, no (or as few as possible) of the added complex values, i.e., $z_1$ and $z_3$, or $z_2$ and $z_4$, should have the same absolute value.

These restrictions are met for the points $z_1$, $z_2$, $z_3$, $z_4$ by taking them in the same constellation and having the conjugate unit 120 pre-process the points $z_3$, $z_4$ by a complex diversity transform (CDT) matrix U:

$$\begin{bmatrix} \tilde{z}_3 \\ \tilde{z}_4 \end{bmatrix} = U \begin{bmatrix} z_3 \\ z_4 \end{bmatrix} \qquad (3)$$

where U is defined as:

$$U = \frac{1}{\sqrt{7}} \begin{bmatrix} 1+2j & 1+j \\ -1+j & 1-2j \end{bmatrix} \qquad (4)$$

The CDT processes the points $z_3$, $z_4$ by rotating them with respect to the origin and by changing their magnitude to convert them into the points $\tilde{z}_3$, $\tilde{z}_4$. Substituting all possible combinations of values for the points $z_3$, $z_4$, e.g., from among the QPSK values, into equation (3) generates respective values of the points $\check{z}_3$, $\check{z}_4$. The generated values constitute the constellation for the points $\check{z}_3$, $\check{z}_4$ which is different than the constellation for the points $z_1$, $z_2$. Accordingly, symbols pairs to be added in slot 200, e.g., $z_1$ and $\check{z}_3$, $z_2$ and $\check{z}_4$, can be distinguished at the receiver despite their respective additions.

Each column of slot 200 represents a different symbol period, e.g., the first column of each of the two added matrices represents the first symbol period 210, the second column of each of the two added matrices represents the second symbol period 220, and so on. With respect to transmission, the last symbol period 230 is transmitted first, the next to last symbol period 240 is transmitted second, and so on. Each row of slot 200 is composed of symbols that are transmitted by a different transmitting antenna or transmitting device, i.e., if there are n rows, then there are n transmitting devices. Slot 200 preferably contains pilot symbols 250 that separate a first portion of the matrix from a second portion of the matrix. Each row has symbols indexed so that the index increases by 4 for each successive column. Accordingly, there are n symbols to the left of the pilot symbols and n symbols to the right of the pilot symbol, i.e., the length of slot 200 is 2n+{number of pilot symbols per slot per transmitter} symbol periods. The first portion and second portion are formed by nesting 2×2 NOBSTBC's around the pilot symbols 250.

The 2×2 NOBSTBC's are each formed by adding a predetermined number of temporally adjacent 2×2 Alamouti codes, entry-to-entry. In the current example, the predetermined number is two. The format of a 2×2 NOBSTBC created by adding two Alamouti codes, entry-to-entry, is:

$$C = \begin{bmatrix} z_1 & -z_2^* \\ z_2 & z_1^* \end{bmatrix} + \begin{bmatrix} \check{z}_3 & \check{z}_4^* \\ \check{z}_4 & -\check{z}_3^* \end{bmatrix} = \begin{bmatrix} z_1 + \check{z}_3 & -z_2^* + \check{z}_4^* \\ z_2 + \check{z}_4 & z_1^* - \check{z}_3^* \end{bmatrix} \quad (5)$$

As mentioned above, $$\begin{bmatrix} \check{z}_3 \\ \check{z}_4 \end{bmatrix} = U \begin{bmatrix} z_3 \\ z_4 \end{bmatrix},$$

and $z_1$, $z_2$, $z_3$, $z_4$ can all be taken in the same constellation, say QPSK.

The first of the two 2×2 Alamouti codes that are added has symbols with subscripts 1 and 2 and the second of the two 2×2 Alamouti codes that are added has symbols with subscripts 3 and 4. As the incoming complex symbol stream 144 is processed, two more Alamouti codes become available, i.e., with symbols having subscripts of 5 and 6, and 7 and 8, respectively (with the points $z_7$, $z_8$ being transformed by U into the points $\check{z}_7$, $\check{z}_8$). The stream 144 makes available symbols from a temporal sequence of Alamouti codes that corresponds to the temporal sequence of symbols in the stream 144. Conceptually, consecutive pairs of Alamouti codes in the temporal sequence are added to form a smaller temporal sequence of NOBSTBC'S. Just as the series of orthogonally-based matrices, e.g. Alamouti codes, is temporally ordered, the corresponding series of NOBSTBC's is also temporally ordered. Each NOBSTBC is a matrix consisting of the first and last columns 210 and 230 only, i.e. matrix C, or of the second and next to last columns 220 and 240 only, and so on. The slot format is such that conceptually, in forming a slot, this nesting of NOBSTBC's converges toward the pilot symbols. Although in the above example the NOBSTBC was formed by adding entries of constituent matrices, the entries can instead be combined by any mathematical operation, e.g. subtraction, multiplication, division, etc. or combinations of operations.

The embodiment depicted in FIG. 2 is configured with two transmitters, i.e. with a transmitter dimension of two (corresponding to the two rows of slot 200) and two or more receivers. The transmit diversity is two, because each symbol is transmitted twice (although, in this case, a symbol and its copy are not exact, since the representation of a symbol is its complex conjugate or negative complex conjugate, as seen in FIG. 2). The symbol rate is two because, for example, the four symbols $z_1$ through $z_4$ are transmitted during two symbol periods, namely the first and last symbol periods in slot 200. Thus, both the transmit diversity and the symbol rate have been doubled over that afforded by Alamouti or Lindskog/Paulraj.

Although the orthogonal-based matrices implemented above are 2×2 Alamouti codes, orthogonal-based matrices of any dimension can be used. Moreover, although pairs of Alamouti codes are shown above as added, any number of orthogonal-based matrices may be combined by mathematical operation(s).

An exemplary slot 300 in accordance with a second embodiment of the invention is shown in FIG. 3. As is the case for slot 200, the length of slot 300 is 2n+{number of pilot symbols per slot per transmitter} symbol periods. Slot 300, like slot 200, has a first symbol period 310, a second symbol period 320, a last symbol period 330, a next to last symbol period 340 and pilot symbol period(s) 250.

Each NOBSTBC, i.e., each matrix consisting of the first and last columns 310 and 330 only, or of the second and next to last columns 320 and 340 only, and so on, is formed by vertically stacking, for concurrent application, a predetermined number of temporally consecutive 2×2 Alamouti codes, so that the Alamouti codes each define the transmission scheme of respective, added transmitting antennas. With the predetermined number set equal to two, the last two rows in slot 300 correspond to a third and a fourth transmitting antenna. As is the case in the first embodiment, in forming the NOBSTBC's the series of 2×2 Alamouti codes is reduced to a smaller series of NOBSTBC's. The slot is formed by temporally nesting the NOBSTBC's, preferably around the pilot symbols that are included within the slot.

If merely two Alamouti codes are stacked, i.e., to produce 4×2 NOBSTBC's, then there are four transmitting antennas, two or more receivers, a transmit diversity of two and a symbol rate of two. Again, both the transmit diversity and the symbol rate have been doubled over that afforded by the methods of Alamouti or Lindskog/Paulraj. Stacking more than two Alamouti codes, and providing extra receivers or receiving capability to service the added transmitting antennas, affords a concomitantly higher symbol rate.

The transmitter dimension of slot 300 (and of the NOBSTBC's that comprise slot 300) is four, which is the sum of the transmitter dimensions of the constituent Alamouti codes, although orthogonal-based matrices of any dimension may be stacked.

FIG. 4 is an example of a slot 400 that is similar to slot 300 except that, whereas the number of predetermined consecutive, 2×2 orthogonal-based matrices stacked for slot 300 is two, the predetermined number of consecutive, 2×2 orthogonal-based matrices stacked for slot 400 is three. Any predetermined number of consecutive orthogonal-based matrices may be stacked in accordance with the present invention.

FIG. 5 shows an exemplary slot 500 in accordance with a third embodiment of the invention. Slot 500 is formed, as in the previous embodiments, by nesting temporally-ordered NOBSTBC's, preferably around pilot symbols. A NOBSTBC for use in the third embodiment is shown below in equation (6).

$$C_{NOBSTBC} = \begin{bmatrix} z_1 & -z_2^* & z_3 & -z_4^* \\ z_2 & z_1^* & z_4 & z_3^* \\ z_3 & -z_4^* & z_1 & -z_2^* \\ z_4 & z_3^* & z_2 & z_1^* \end{bmatrix} \quad (6)$$

The NOBSTBC is formed by stacking, to each temporally adjacent pair of 2×2 Alamouti codes, the same pair with the order of the codes reversed so that the NOBSTBC has a checkerboard pattern (of four checker squares) and the number of transmitting antennas is doubled. Hereinafter, a "checkerboard pattern" for a pair of matrices that are constituents of a larger matrix is defined as such an arrangement that each pair consists of a member and an other member, wherein each member of the pair is diagonally adjacent to a copy of itself, horizontally adjacent to at least one copy of the other member, and vertically adjacent to at least one copy of the other member. As utilized hereinafter, matrices that are constituents of a larger matrix are "diagonally adjacent" if no intervening rows or columns of the larger matrix exist between them and they are not horizontally or vertically adjacent to one another. Similarly, matrices that are constituents of a larger matrix are identified as horizontally adjacent if no intervening columns of the larger matrix exist between them and they occupy the same rows. Analogously, matrices that are constituents of a larger matrix are denoted vertically adjacent if no intervening rows of the larger matrix exist between them and they occupy the same columns. As applied to matrix $C_{NOBSTBC}$ in equation (5) above, if $C_{NOBSTBC}$ is partitioned into an upper left 2×2 matrix, an upper right 2×2 matrix, a lower left 2×2 matrix and a lower right 2×2 matrix, the upper left 2×2 matrix is a member that is diagonally adjacent to a copy of itself, i.e. the lower right 2×2 matrix. Further, the upper left 2×2 matrix is vertically adjacent to the lower left 2×2 matrix and horizontally adjacent to the upper right 2×2 matrix. It will be noted that any one of the constituent 2×2 matrices has a diagonal neighbor, a vertical neighbor, and a horizontal neighbor. As a result of the checkerboard stacking, the sequence of 2×2 Alamouti codes is reduced to a smaller sequence of NOBSTBC's. In this arrangement, for each NOBSTBC, and as seen from equation (6), the symbols in the second and fourth symbol periods (or columns) are complex conjugates (or negative complex conjugates) of symbols in the first and third symbol periods (or columns), and thus, the symbols in the second and fourth columns are placed in a different half of the slot 500 from the half in which the symbols in the first and third columns are placed. Furthermore, in this arrangement the symbols in the first column are duplicated in the third column and the symbols in the second column are duplicated in the fourth column; therefore, the symbols in the first and third columns are placed in different quarters of the same half of the slot 500, and the symbols in the second and fourth columns are likewise placed in different quarters of the other half of the slot 500. Again, the slot 500 is formed by temporally nesting the NOBSTBC's, but with the center two (second and third) columns reversed (so that copies are in the same slot half, but different quarters, and conjugates are in different slot halves), and nesting is preferably around the pilot symbols that are included within the slot.

If merely two pairs of 2×2 Alamouti codes are stacked to produce a 4×4 NOBSTBC, then there are four transmitting antennas, one receiver, a symbol rate of one, and a transmit diversity of four. The transmit diversity is doubled over that afforded by the methods of Alamouti or Lindskog/Paulraj.

There are many variations of the third embodiment. The orthogonal based constituent matrices in the four checker squares may be transposed, negated, conjugated or permuted, or modified by any combination of these. As one example, the lower, right-hand Alamouti code (in the lower, right-hand checker square) of the NOBSTBC may have its rows or columns exchanged. As applied to matrix $C_{NOBSTBC}$ in equation (6) above, if the rows of its lower, right-hand constituent matrix are reversed, $C_{NOBSTBC}$ is formatted instead as:

$$C'_{NOBSTBC} = \begin{bmatrix} z_1 & -z_2^* & z_3 & -z_4^* \\ z_2 & z_1^* & z_4 & z_3^* \\ z_3 & -z_4^* & z_2 & z_1^* \\ z_4 & z_3^* & z_1 & -z_2^* \end{bmatrix} \quad (7)$$

The three techniques of the above-described three embodiments, i.e. mathematical combining, simple stacking and checkerboard stacking, respectively, may be concurrently used in any combination. For example, NOBSTBC's, each formed by checkerboard stacking, may be simply stacked. Thus, if the checkerboard stacking forms a 4×4 NOBSTBC from two 2×2 Alamouti codes, then n temporally adjacent NOBSTBC's can be simply stacked to form temporally adjacent NOBSTBC's of dimension 4n×4. Accordingly, if n is set equal to 3, then the 4×4 NOBSTBC's are simply stacked to form 12×4 NOBSTBC's, i.e. NOBSTBC's arranged for implementation with 12 transmitting antennas. Combinations of the three techniques may be implemented to achieve any degree of transmit diversity, with any number of transmitting antennas, and at any data rate. Moreover, instead of adding transmitters or symbol periods, any orthogonal division of the available resources may be used, such as by frequency division, spreading code division, OFDM subcarriers, wavelets, or any combination of these or others.

As demonstrated above, the transmit diversity and symbol rate in a wireless mobile communication system are increased by increasing the number of receivers to more than one and/or increasing the number of transmitting devices to more than two, with the transmitting devices transmitting in an ISI-robust, time slot format that incorporates non-orthogonal-based space-time block codes so that copies and complex conjugates (or negative complex conjugates) of the same symbol that are transmitted from different antennas are mutually separated into non-adjacent parts of the slot. Each non-orthogonal-based space-time block code is composed of orthogonal-based space-time block codes, preferably 2×2 Alamouti codes. Preferably, sequences of complex conjugates are time-reversed in the slot. It is preferred that the NOBSTBC and the corresponding slot both be configured for a symbol rate that equals the number of receiving antennas. As a further preferred feature, if both copies of the symbols and complex conjugates of the symbols are transmitted, then the NOBSTBC is divided so that complex conjugates (or negative complex conjugates) are transmitted in different halves of the slot, and copies of the same symbols are transmitted in the same half of the slot, e.g. in different quarters.

Any multiple access protocol may be used in a system applying the ISI-robust time slot formats of this invention. These include, e.g., TDMA, any version of CDMA, FDMA, SDMA, or any combination thereof. The invention may be implemented with any channel code with or without interleaving, including block codes, convolutional codes, high density parity-check codes and trellis-coded modulations. The invention may further be implemented in combination with any other transmit diversity method, including delay diversity, antenna hopping, phase sweep, phase hopping, complex weighting, space-time trellis coding and orthogonal transmit diversity. Any method of pilot signaling may be added to the system, with pilot symbols locatable anywhere in or outside the suggested slot formats. Any scheduling protocol or other higher layer signaling may be applied to the data transmitted implying, e.g., dynamic mode changes, dynamic changes of modulation alphabets, diversity degree, data rate, etc. The algorithms of the present invention may be implemented in hardware, software, firmware or by any other means.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for allocating to transmitting devices a stream of complex symbols for transmission in parallel by the transmitting devices, the stream including replications that, for at least some of the symbols, include at least one of a complex conjugate and a negative complex conjugate of the symbol, the parallel transmission being temporally divided into time slots, the time slots being temporally divided into symbol periods each time slot having respective first and second portions, said method comprising:

allocating the stream to the transmitting devices and to the symbol periods so that, for at least one of said slots, the symbols in at least one symbol period in the first portion of the at least one slot have at least one of complex conjugate and negative complex conjugate representations in at least one symbol period in the second portion of the at least one slot, said representations and corresponding symbols defining a non-orthogonal-based matrix having dimensions that represent transmitting devices and symbol periods, respectively, said non-orthogonal-based matrix having, as its constituents, orthogonal-based matrices; and transmitting, from the transmitting devices, in parallel and in accordance with said allocating to the devices and the periods, signals having characteristics that are represented by the complex symbols in the allocated stream.

2. The method of claim 1, wherein the symbol periods in the first portion of the at least one slot temporally precede the symbol periods in the second portion of the at least one slot.

3. The method of claim 1, wherein the at least one symbol period in the first portion and the at least one symbol period in the second portion both comprise multiple symbol periods.

4. The method of claim 1 wherein, for the at least one slot, at least one pilot symbol separates the first portion from the second portion, the at least one pilot symbol being usable by a receiver in estimating a characteristic of a channel between at least one of the transmitting devices and a receiver.

5. The method of claim 1, wherein the at least one symbol period in the first portion is a single symbol period and the at least one symbol period in the second portion is a single symbol period.

6. The method of claim 1, wherein the time slots are configured to be small enough so that transmission quality is substantially constant during a time slot.

7. The method of claim 1, wherein at least one of the orthogonal-based matrices is a 2 by 2 matrix that defines a configuration in which one transmitting device transmits one symbol in one symbol period, another transmitting device transmits another symbol in the one symbol period, and in a subsequent symbol period the one transmitting device transmits a complex conjugate of the another symbol.

8. The method of claim 1, wherein the constituent orthogonal-based matrices comprise at least two orthogonal-based matrices that, when combined, entry-to-entry, by a mathematical operation produce the non-orthogonal-based matrix.

9. The method of claim 8, wherein the mathematical operation is at least one of addition, subtraction, multiplication and division.

10. The method of claim 8, wherein the mathematical operation adds, for at least one entry, respective symbols of the at least two matrices, the respective symbols being designed for operation under respective complex modulation schemes, at least two of the modulation schemes differing as to the respective set of points in the complex plane to which signals are mapped so that no point in one set coincides with any point in the other set.

11. The method of claim 1, wherein the stream is formed from an incoming stream having a temporal order, the at least one time slot comprising multiple time slots, the symbols in the orthogonal-based matrices defining the orthogonal-based matrices of the multiple time slots in a temporal sequence in accordance with a temporal order of the symbols in the incoming stream.

12. The method of claim 11, wherein the constituent orthogonal-based matrices comprise at least two orthogonal-based matrices that are consecutive in the temporal sequence and that, when combined, entry-to-entry, by a mathematical operation produce the non-orthogonal-based matrix.

13. The method of claim 11, wherein the temporal sequence of the orthogonal-based matrix constituents of the non-orthogonal-based matrices of the multiple time slots defines a temporal order of the non-orthogonal-based matrices of the multiple time slots, at least one of the multiple time slots comprising a nesting, in a temporal order, of ones of the temporally ordered non-orthogonal-based matrices.

14. The method of claim 13, wherein the temporal order of the nesting corresponds to the temporal order of the incoming stream.

15. The method of claim 14, wherein the nesting converges around at least one pilot symbol that is used by a receiver for estimating a characteristic of a channel between the receiver and at least one of the transmitting devices.

16. The method of claim 11, wherein the constituents comprise consecutive ones of the orthogonal-based-matrices in the temporal sequence, the consecutive orthogonal-based matrices having respective transmitting device dimensions, and the non-orthogonal-based matrix having a transmitting device dimension that is equal to a sum of the respective transmitting device dimensions of the consecutive orthogonal-based matrices.

17. The method of claim 16, wherein at least one pair of consecutive orthogonal-based matrices of the consecutive constituents of respective non-orthogonal-based matrices is arranged within the respective non-orthogonal-based matrix in a checkerboard pattern, each of the at least one pair comprising a member and an other member, whereby each member of the pair is diagonally adjacent to a copy of itself, horizontally adjacent to at least one copy of the other member, and vertically adjacent to at least one copy of the other member.

18. The method of claim 1, wherein the representations and corresponding symbols that define a non-orthogonal-based matrix are separated by at least one symbol period.

19. The method of claim 1, wherein the stream is formed from an incoming stream that has a temporal order, one of the representations and the corresponding symbols that define a non-orthogonal-based matrix being arranged in accordance with said temporal order and the other of the representations and corresponding symbols being arranged in accordance with a reverse of said temporal order.

20. An apparatus for allocating complex symbols for parallel transmission, the parallel transmission being temporally divided into time slots, the time slots being divided into symbol periods and each time slot having respective first and second portions, the apparatus comprising:
at least two transmitting devices; and
a symbol allocating module for allocating the complex symbols to the symbol periods and to the transmitting devices so that, for at least one of the time slots, the symbols in at least one symbol period in the first portion of the at least one time slot have at least one of complex conjugate and negative complex conjugate representations in at least one symbol period in the second portion of the at least one time slot, the representations and corresponding symbols constituting a non-orthogonal-based matrix having dimensions that represent transmitting devices and symbol periods, respectively, said non-orthogonal matrix having, as its constituents, orthogonal-based matrices, the transmitting devices receiving the allocated complex symbols and transmitting, in parallel and in accordance with said allocating to the periods and the devices, signals having characteristics that are represented by the allocated complex symbols.

21. The apparatus of claim 20, wherein the apparatus comprises a base station in a wireless mobile communication system.

22. The apparatus of claim 20, wherein the apparatus comprises a mobile terminal.

23. The apparatus of claim 22, wherein the apparatus comprises a mobile phone.

24. The apparatus of claim 20, wherein the constituent orthogonal-based matrices comprise at least two orthogonal-based matrices that, when combined, entry-to-entry, by a mathematical operation produce the non-orthogonal-based matrix.

25. The apparatus of claim 24, wherein the mathematical operation adds, for at least one entry, respective symbols of the at least two matrices, the respective symbols being designed for operation under respective complex modulation schemes, at least two of the modulation schemes differing as to the respective set of points in the complex plane to which signals are mapped.

26. The apparatus of claim 25, the differing being such that no point in one set coincides with any point in the other set.

27. The apparatus of claim 20, wherein the stream is formed from an incoming stream having a temporal order, the at least one time slot comprising multiple slots, and the symbols in the orthogonal-based matrices defining the orthogonal-based matrices of the multiple slots in a temporal sequence in accordance with a temporal order of the symbols in the incoming stream.

28. The apparatus of claim 27, wherein the constituent orthogonal-based matrices comprise at least two orthogonal-based matrices that are consecutive in the temporal sequence and that, when combined, entry-to-entry, by a mathematical operation produce the non-orthogonal-based matrix.

29. The apparatus of claim 27, wherein the temporal sequence of the orthogonal-based matrix constituents of the non-orthogonal-based matrices of the multiple time slots defines a temporal order of the non-orthogonal-based matrices of the multiple time slots, and at least one of the multiple time slots comprising a nesting, in a temporal order, of ones of the temporally ordered non-orthogonal-based matrices.

30. The apparatus of claim 27, wherein the constituents comprise consecutive ones of the orthogonal-based-matrices in the temporal sequence, the consecutive orthogonal-based matrices having respective transmitting device dimensions, and the non-orthogonal-based matrix having a transmitting device dimension that is equal to a sum of the respective transmitting device dimensions of the consecutive orthogonal-based matrices.

31. The apparatus of claim 30, wherein at least one pair of consecutive orthogonal-based matrices of the consecutive constituents of respective non-orthogonal-based matrices is arranged within the respective non-orthogonal-based matrix in a checkerboard pattern, each of the at least one pair comprising a member and an other member, and whereby each member of the pair is diagonally adjacent to a copy of itself, horizontally adjacent to at least one copy of the other member, and vertically adjacent to at least one copy of the other member.

32. The apparatus of claim 20, wherein the stream is formed from an incoming stream that has a temporal order, one of the representations and the corresponding symbols that constitute a non-orthogonal-based matrix being arranged in accordance with said temporal order and the other of the representations and corresponding symbols being arranged in accordance with a reverse of said temporal order.

33. The apparatus of claim 20, wherein the symbol periods in the first portion of the at least one time slot temporally precede the symbol periods in the second portion of the at least one time slot.

34. The apparatus of claim 20, wherein the at least one symbol period in the first portion and the at least one symbol period in the second portion both comprise multiple symbol periods.

35. The apparatus of claim 20 wherein, for the at least one time slot, at least one pilot symbol separates the first portion from the second portion, the at least one pilot symbol being usable by a receiver in estimating a characteristic of a channel between at least one of the transmitting devices and a receiver.

36. The apparatus of claim 20, wherein the at least one symbol period in the first portion is a single symbol period and the at least one symbol period in the second portion is a single symbol period.

37. The apparatus of claim 20, wherein the time slots are configured to be small enough so that transmission quality is substantially constant during a slot.

38. A computer program for allocating to transmitting devices a stream of complex symbols for transmission in parallel by the transmitting devices, the stream including replications that, for at least some of the symbols, include at least one of a complex conjugate and a negative complex conjugate of the symbol, the parallel transmission being temporally divided into time slots, and the time slots being temporally divided into symbol periods and each time slot having respective first and second portions, the method comprising:

instruction for allocating the stream to the symbol periods and to said transmitting devices so that, for at least one of said time slots, the symbols in at least one symbol period in the first portion of the at least one time slot have at least one of complex conjugate and negative complex conjugate representations in at least one symbol period in the second portion of the at least one time slot, the representations and corresponding symbols defining a non-orthogonal-based matrix having dimensions that represent transmitting devices and symbol periods, respectively, and the non-orthogonal matrix having, as its constituents, orthogonal-based matrices; and instruction for receiving the allocated stream and for generating for transmission, in parallel and in accordance with said allocating to the periods and the devices, signals having characteristics that represent the complex symbols in the allocated stream.

39. The computer program of claim 38, wherein the constituent orthogonal-based matrices comprise at least two orthogonal-based matrices that, when combined, entry-to-entry, by a mathematical operation produce the non-orthogonal-based matrix.

40. The computer program of claim 38, wherein the stream is formed from an incoming stream having a temporal order, the at least one time slot comprising multiple slots, the symbols in the orthogonal-based matrices defining the orthogonal-based matrices of the multiple time slots in a temporal sequence in accordance with a temporal order of the symbols in the incoming stream, the constituents comprising consecutive ones of the orthogonal-based-matrices in the temporal sequence, the consecutive orthogonal-based matrices having respective transmitting device dimensions, and the non-orthogonal-based matrix having a transmitting device dimension that is equal to a sum of the respective transmitting device dimensions of the consecutive orthogonal-based matrices.

* * * * *